July 14, 1936.  F. E. LARAMORE  2,047,587
BRAKE
Filed March 8, 1935
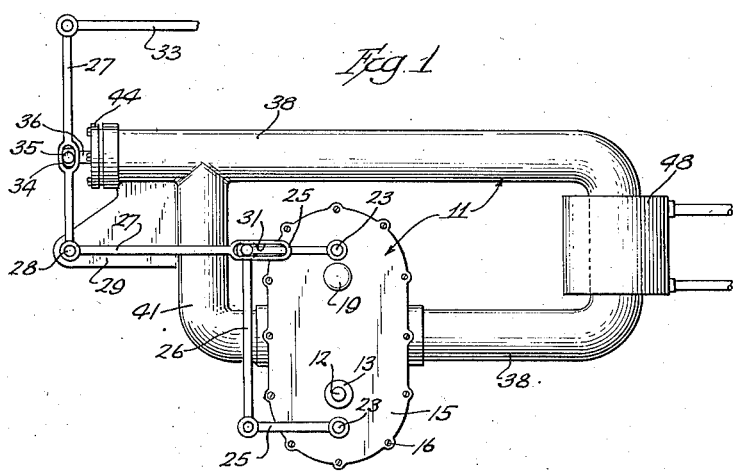
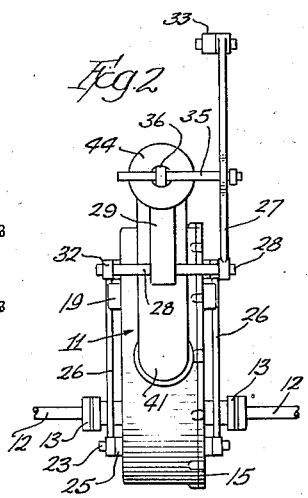
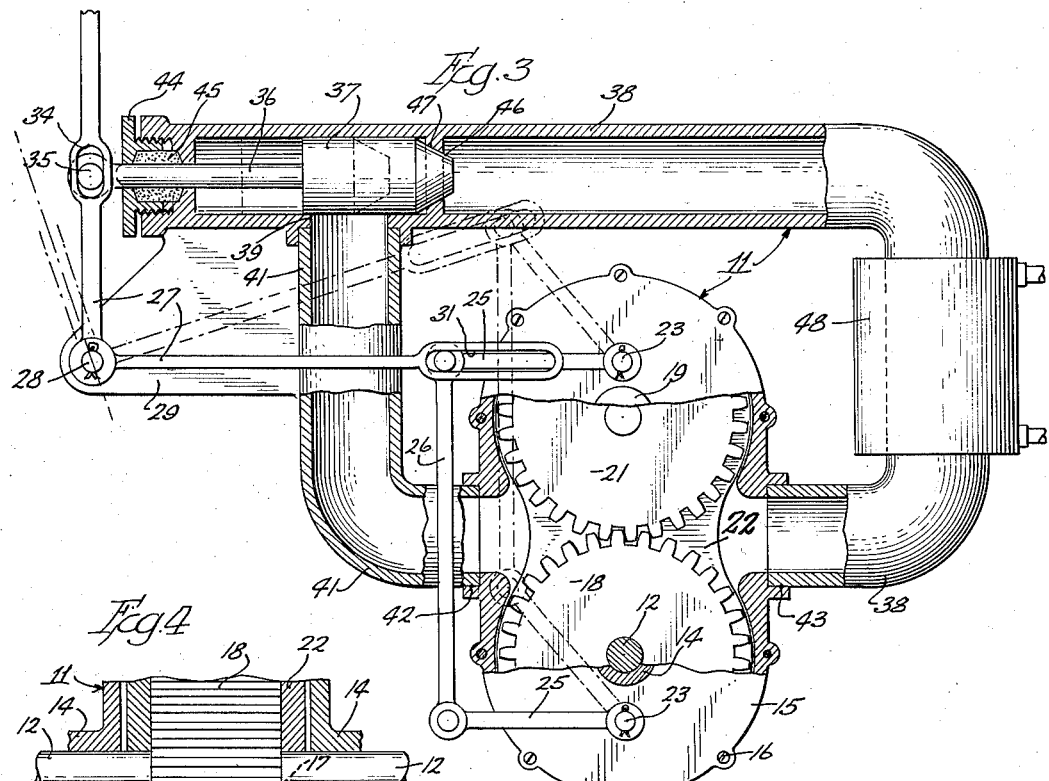
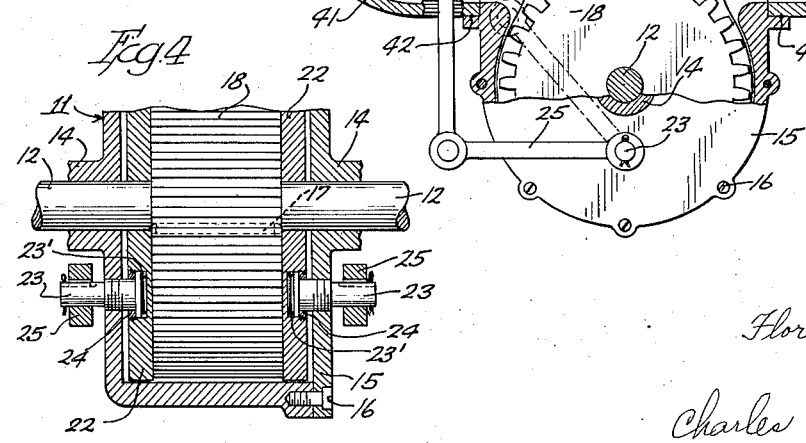
Inventor:
Florian E. Laramore
Charles B. Rasmussen
Atty.

Patented July 14, 1936

2,047,587

UNITED STATES PATENT OFFICE 2,047,587

BRAKE

Florian E. Laramore, Chicago, Ill.

Application March 8, 1935, Serial No. 10,021

5 Claims. (Cl. 188—92)

This invention relates in general to brakes, and has more particular reference to an hydraulic brake in which the flow of a fluid impelled by the mechanism to be braked is variably controllable to resist the operation of said mechanism.

A principal object of the invention is the provision of a brake in which a member positively driven by the mechanism to be braked normally idles in a fluid which may be constrained to be impelled by said member, and the resulting flow of which may be variably controlled to resist the operation of said member.

Another important object of the invention is the provision of actuating mechanism for the mechanism for forcing the fluid to be driven by said member and for the fluid flow controlling mechanism which requires a very small force to operate.

A further important object of the invention is the provision of such actuating mechanism which may simultaneously control the operation of the mechanism for forcing the fluid to be driven by said member and the fluid flow controlling mechanism.

Another object of the invention is the provision of a substantially frictionless brake in which a fluid is employed to resist the operation of the member to be braked and means are provided for cooling said fluid to dissipate any heat so generated therein.

Numerous other objects and advantages of the invention will be apparent as it is better understood from the following description, which, taken in connection with the accompanying drawing, discloses a preferred embodiment thereof.

In the drawing,

Figure 1 is a side elevation of a brake embodying the features of my invention;

Fig. 2 is an end elevational view;

Fig. 3 is an enlarged side elevational view partly in section; and

Fig. 4 is an enlarged detail vertical sectional view through the lower gear of Fig. 3.

Referring more particularly to the drawing, reference numeral 11 indicates in general a casing for supporting and inclosing the brake mechanism, which casing is preferably made of cast iron or the like, and comprises a plurality of separate parts, to be later described, suitably secured together in any desired manner to constitute a unitary assemblage.

A shaft 12 which is rigidly secured to the mechanism to be braked (not shown), extends laterally through the casing 11 through suitable packing members 13 of any desired construction, and is rotatably supported therein by means of bearing members 14 which are preferably cast integral with said casing, or a part thereof, such as a side cover plate 15 rigidly secured thereto in any desired manner, as by stud bolts 16.

Rigidly secured to the shaft 12 interiorly of the main part of the casing 11, by means of a key and keyway 17 (Fig. 4) is a gear 18. Rotatably secured within the casing 11 in suitable bearing members 19 is a gear 21 similar to and meshing with the gear 18. The interior of the main part of the casing 11 housing these gears 18 and 21 is so shaped as to almost contact the peripheral faces of said gears for the major portion of their circumferences and leave only a small clearance therebetween.

Positioned between the gears 18, 21 and the inside walls of the main part of the casing 11 are two plate members 22, one on each side of the gears, which are mounted for limited lateral sliding movement on the stud shaft of the gear 21 and the shaft 12, and substantially correspond in form to the peripheral shape of the two gears, although preferably the circumferential portions of the plates more nearly contact the casing than do the teeth of the gears. Two stud bolts 23 have their head portions secured by means of threaded washers or retaining members 24, within suitable recesses in the outer face of each of the plate members 22 of the gears 21 and 18, respectively. Confined between the inner end of the head portion of each of these bolts 23 and its respective plate 24 is a suitable small coil spring 23' for a purpose to be later described; these parts being so arranged as to allow limited axial movement and unlimited rotational movement of the bolts 23 relative to their respective plate 22.

The central portion of each of the stud bolts 23 is threaded through a suitable tapped hole in the wall of the casing 11 or cover plate 15, respectively, so that a slightly reduced end portion of each of said bolts extends exteriorly of the casing. To this reduced end portion of each of the bolts 23 is rigidly secured in any desired manner one end of a lever 25. The opposite ends of these levers 25 on the same side of the casing 11 are pivotally connected together by means of a link 26.

The two levers 25 and the interconnecting link 26 on each side of the casing 11 associated with each plate member 22 constitute a parallel motion linkage, the operation of which results in synchronous rotation of the two related stud bolts 23 to laterally move that plate 22 connected thereto relative to the casing and the gears 18, 21.

This parallel motion linkage on one side of the casing is adapted to be actuated by a bell crank lever 27 rigidly secured at its fulcrum to a cross rod 28, which is in turn pivoted in a supporting rib 29 depending from and preferably integral with a portion of the casing 11.

The horizontal arm of the bell crank 27 is provided with an elongated slot 31 at its end for engagement with the pivot pin connecting the upper lever 25 and the link 26 to actuate the parallel motion linkage of which said members are a part. To the other end of the cross rod 28 is rigidly secured one end of an actuating lever 32 (Fig. 2) which is identical to the lower arm of the bell crank 27, and actuates the parallel motion linkage on the other side of the casing simultaneously with the first mentioned linkage. It will thus be apparent that actuation of the bell crank 27 will rotate all four stud bolts 23 simultaneously an equal amount. The threads of those bolts on one side of the casing are opposite to those on the other side, so that such rotation of said bolts will cause the plate members 22 to be moved toward or away from each other the same distance.

An actuating member 33 (Fig. 1) may be pivotally connected to the upper end of the vertical arm of the bell crank 27 to be operated in any desired manner, either manually or by power, as a control member for the brake.

Intermediate its ends the vertical arm of the bell crank 27 is provided with a slot 34 which is adapted to engage a rod 35. The rod 35 is secured to the outer end of a piston or valve rod 36, the inner end of which is rigidly secured to a piston or plunger valve member 37. The plunger 37 fits snugly within a hollow L-shaped tube 38 constituting part of the casing 11, and is adapted to be reciprocated therein.

Adjacent the plunger 37 in its innermost position the tube 38 is provided with a port 39 communicating with a tube 41, one end of which is secured thereto and which also constitutes part of the casing 11. The other end of the tube 41 is suitably secured within a flanged opening 42 in the main part of the casing opposite to the point of engagement between the gears 18 and 21. The casing is provided with another flanged opening 43, similar to and opposite the opening 42, within which the short end of the L-shaped tube 38 is rigidly secured to form a leakproof joint therewith. The other end of the tube 38 is or may be closed by a retaining member 44 through which the valve rod 36 extends and which is adapted to maintain a desired or well-known packing 45 around said valve rod.

In its translational movement the plunger valve member 37 is adapted to open, partially close, or close completely the port 39 which interconnects the tube 38 and 41. At its inner end the plunger 37 is provided with a tapered portion 46 which is adapted in the innermost or closed position of the plunger to seat against a complementally shaped annular shoulder or flange 47 constituting a stationary valve member integral with the tube 38.

A cooling coil or unit 48 of any desired construction may be provided around a suitable portion of the tube 38 for a purpose to be described hereinafter.

The casing 11 is filled with a fluid, such as oil, glycerine, or the like, preferably up to a point slightly below the port 39.

In the released or normal position of the brake, the plates 22 are up against the walls of the casing to provide clearance spaces or passages for the fluid between said plates and the gears 18, 21. Since the gear 18 is rigidly secured to the shaft 12, which constitutes the member or part of the mechanism to be braked, it will be rotated, along with gear 21, when said mechanism is operating. The gears so rotated will merely idle in the fluid if the plates 22 are in normal or retracted position. Upon movement of the plates 22 towards and into operative position shown in full lines in the drawing, however, in which they are in contact with the faces of said gears, the latter will function in the manner of an ordinary gear type oil pump to impel the fluid through the tubes 41 and 38, as indicated by the arrows in Fig. 3. The function of the springs 23' is to maintain the plate members 22 in contact with the outer faces of the gears when the plates are in their innermost position to prevent unnecessary leakage of the fluid, while at the same time insuring against positive binding between the gears and the plates.

Simultaneously with the movement of the plates 22, as above described, the plunger valve 37 will be moved towards its closed or full line position of Fig. 3. During such movement, the plunger 37 will gradually close the port 39 to thereby variably resist the flow of the fluid as caused by the inward movement of the plates 22 forcing the fluid to be circulated by the gears 18, 21. In its fully closed position the plunger will not only completely block the port 39, but will seat against the stationary valve member or flange 47 to insure a positive blocking of the flow of the fluid.

It is apparent, therefore, that movement of the bell crank 27 towards and into its full line position of Figs. 1 and 3 will cause the driven gears to circulate the fluid through the casing, and simultaneously cause a variable, controlled resistance to be applied against the resultant flow of the fluid. A readily variable amount of power of the driving mechanism or mechanism to be braked will thus be expended. Upon complete closing, the plunger valve member 37 in preventing circulation of the fluid will substantially prevent operation of the gears and, hence, of the mechanism to be braked.

In their normal idling movement, the gears 18, 21 require substantially no power to operate. In circulating the fluid through the casing, however, the gears transmit a certain amount of power from the driving mechanism or the mechanism to be braked into kinetic energy of the circulating fluid. Some of the power will also be transformed into heat energy which will be dissipated by the cooler 48.

It will thus be seen that the above described mechanism constitutes a positive brake with which a desired amount of resistance to the driving mechanism may be applied with a minimum amount of effort, and that it may be used with any desired rotating mechanism, such as turbines, vehicle wheels, generators, and the like.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being a preferred embodiment thereof.

I claim:

1. In a brake, a casing, a quantity of fluid in said casing, a gear rotatably positioned in said casing and adapted to be positively driven by mechanism to be braked, said gear being normally idly operable in said fluid, a plate member in said casing adjacent said gear and normally positioned to provide a passage therebetween for said fluid, actuating mechanism for moving said plate member against the side of the gear so as to substantially eliminate said passage and constrain said fluid to be impelled by said gear through said casing, and means for variably controlling the resulting flow of said fluid to resist the operation of said gear.

2. In a brake, a casing, a quantity of fluid in said casing, a gear rotatably positioned in said casing and adapted to be positively driven by mechanism to be braked, said gear being normally idly operable in said fluid, a plate member in said casing adjacent said gear and normally positioned to provide a passage therebetween for said fluid, actuating mechanism for moving said plate member against the side of the gear so as to substantially eliminate said passage and constrain said fluid to be impelled by said gear through said casing, means for variably controlling the resulting flow of said fluid to resist the operation of said gear, and means for cooling the fluid to dissipate the heat so generated therein.

3. In a brake, a casing, a quantity of liquid in said casing, a plurality of gears rotatably positioned in said casing and adapted to be positively driven by mechanism to be braked, plate members axially positioned within said casing adjacent said gears to normally provide a passage therebetween for said fluid and movable toward said gears into operative position to constrain said liquid to be impelled by said gears through said casing, valve means for variably controlling the resulting flow of said liquid to resist the operation of said gears, and means for simultaneously operating said valve means and moving said plate members to operative position.

4. In a brake, a casing, a quantity of fluid in said casing, a gear rotatably positioned in said casing and adapted to be positively driven by mechanism to be braked, said gear being normally idly operable in said fluid, plate members in said casing adjacent said gear and normally positioned to provide a passage on either side of the gear for said fluid, actuating mechanism for moving said plate members against the sides of the gear so as to substantially eliminate said passage and constrain said fluid to be impelled by said gear through said casing, and means for variably controlling the resulting flow of said fluid to further resist the operation of said gear.

5. In a brake, a casing, a quantity of fluid in said casing, a gear rotatably positioned in said casing and adapted to be positively driven by mechanism to be braked, said gear being normally idly operable in said fluid, a plate member in said casing adjacent said gear and normally positioned to provide a passage therebetween for said fluid, actuating mechanism for moving said plate member into resilient engagement with said gear so as to substantially eliminate said passage and constrain said fluid to be impelled by said gear through said casing and operable in the opposite direction to positively move said plate member into normal position, and means for variably controlling the resulting flow of said fluid to resist the operation of said gear.

FLORIAN E. LARAMORE.